United States Patent [19]

Schmalzl

[11] Patent Number: 5,009,304
[45] Date of Patent: Apr. 23, 1991

[54] MULTI-DIRECTIONAL DRIVE FOR ROLLER CONVEYORS OR SIMILAR

[76] Inventor: Ekkehard Schmalzl, Am Schlierbach 5, D-7860 Schopfheim, Fed. Rep. of Germany

[21] Appl. No.: 492,678
[22] Filed: Mar. 13, 1990
[30] Foreign Application Priority Data
  Mar. 17, 1989 [DE] Fed. Rep. of Germany ....... 3908856
[51] Int. Cl.$^5$ .............................................. B65G 37/00
[52] U.S. Cl. .................................. 198/372; 198/787; 198/791
[58] Field of Search .................. 193/35 MD; 198/372, 198/787, 789, 791

[56] References Cited
U.S. PATENT DOCUMENTS
  3,920,290 11/1975 Evarts ........................... 193/35 MD
FOREIGN PATENT DOCUMENTS
  2332549 1/1974 Fed. Rep. of Germany ...... 198/787
  WO89/07081 8/1989 PCT Int'l Appl. ................. 198/787
  1465368 3/1989 U.S.S.R. .............................. 198/787

Primary Examiner—Robert P. Olszewski
Assistant Examiner—Cheryl L. Gastineau
Attorney, Agent, or Firm—Poms, Smith, Lande & Rose

[57] ABSTRACT

A multi-directional drive for roller conveyors or similar which is capable of reversible conveying of any goods deposited on it in the X and Y directions comprises essentially a plurality of rolling elements (4, 6) consecutively configured on a shaft configuration (8) which consists of a hollow quill (10) and a rotating shaft (12) mounted coaxially within it. The quill and rotating shaft can rotate independently of each other or synchronously where gearwheels (14, 16, 18) located in the rolling elements (4,6) convert the directions of rotation induced in the quill (10) or rotating shaft (12) such that the rolling elements (4,6) rotate either perpendicular to the longitudinal axis of the shaft configuration (8) or about it.

3 Claims, 1 Drawing Sheet

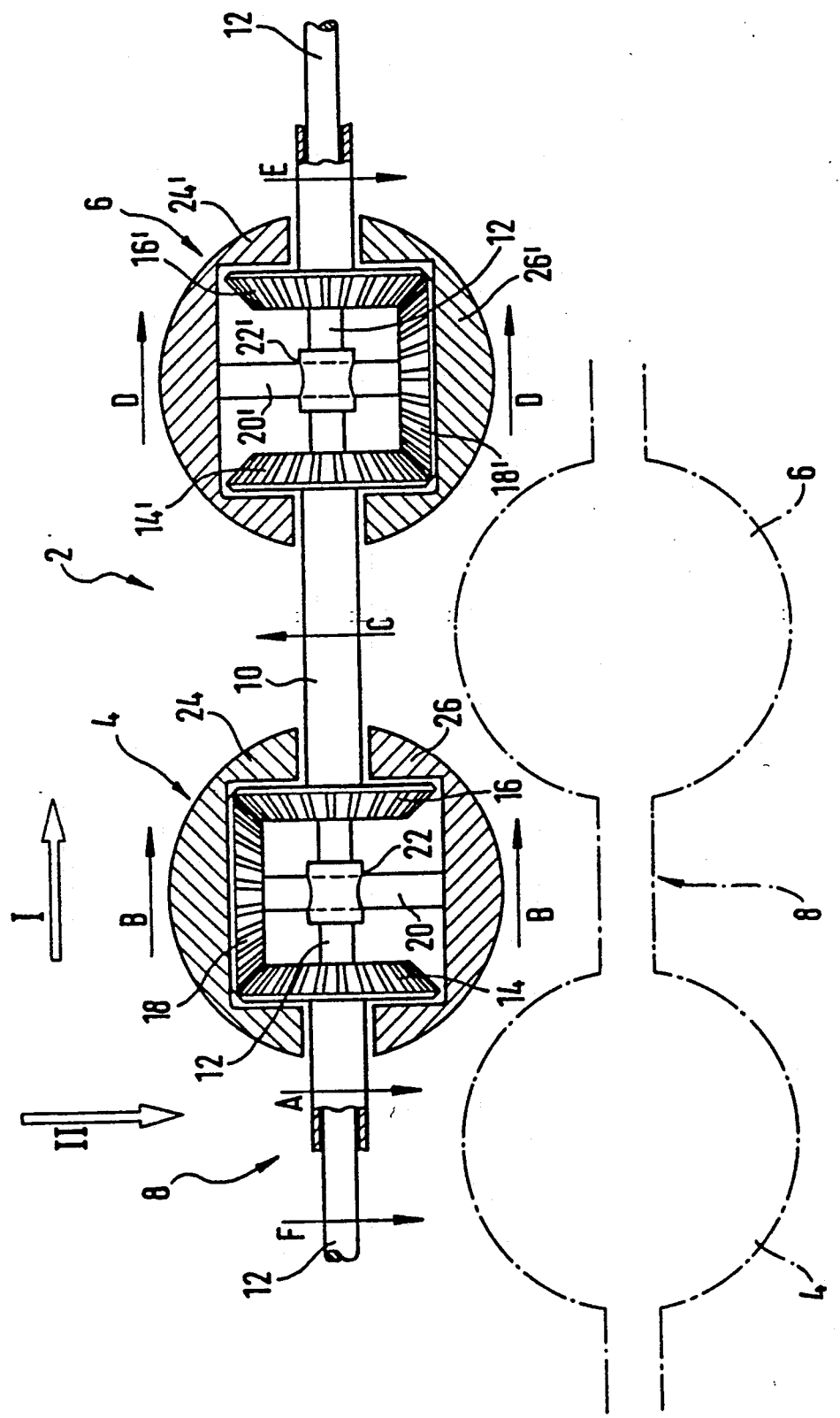

MULTI-DIRECTIONAL DRIVE FOR ROLLER CONVEYORS OR SIMILAR

The present invention relates to a multi-directional drive for roller conveyors or similar.

Drives for roller conveyors are known in the art in which a plurality of rollers located in one plane are located on parallel rotational axes, where an appropriate drive provided for the individual rotational axes also imparts rotational motion to the rollers which are attached to the axes in such a way that the former cannot rotate independently. The art of making such drives reversible is also known, i.e., the direction of rotation of the rotational axes and thus of the rollers can be switched from anticlockwise to clockwise and vice versa. Goods located on the roller conveyor or its rollers are conveyed by the rotation of the rollers in their direction of rotation. A roller conveyor of this type is schematically represented, for example, in FIG. 1 of Auslegeschrift (patent specification laid out) DE-AS 1 237 003. As also follows from FIG. 1 of DE-AS 1 237 003, an inherent problem of roller conveyors is that abrupt changes of direction, e.g. 90° branches or similar, cannot be included in the design since such tight radii of curvature cannot be achieved by means of conventional roller conveyors. DE-AS 1 237 003 therefore proposes located a ball table at the angle of two roller conveyors which are offset horizontally at 90° to each other, by means of which the conveyed goods arriving on one of the roller conveyors can first be braked and then can be conveyed further through 90° in the running direction of the branching roller conveyor. The ball table in accordance with DE-AS 1 237 003 consists of a plurality of balls mounted in cups, which balls can be driven either in the running direction of the roller conveyor or at 90° to this in the running direction of the other roller conveyor by means of drive couplings which can be individually switched.

The ball table according to DE-AS 1 237 003 comprises a multiplicity of individual components which can be actuated separately and is thus of relatively complex construction, which in turn results in susceptibility to faults, especially under harsh operating conditions.

A multi-directional drive for roller conveyors has also become known in the art through DE-AS 25 15 009 in the same category in which a transfer device is presented which is also configured in the form of a table at the angle of two roller conveyors offset by 90° relative to each other. The table located in the angle is diagonally divided such that two right-angle triangles are formed in each of which one leg of the right-angle triangles forms the open external faces of the ball table and the two remaining legs are contiguous with the open end of the roller conveyors. In each of the right-angle triangles a plurality of shafts with rolling elements mounted on the shafts diminishes with increasing distance from the roller conveyor as the right-angle triangle, which is connected there, tapers to its apex. The longitudinal axes of the shafts in the two right-angle triangles are at an angle of 90° to each other, where each corresponds to the main running direction of its concomitant roller conveyor.

The rolling elements themselves consist of a base element which is mounted on the relevant shaft such that it cannot rotate independently where the base element is provided around its periphery with a plurality of auxiliary rollers which are mounted such that they can rotate, whereby the rotational axes of the individual auxiliary rollers are located perpendicular to the axis of the shaft bearing the rolling elements.

A fictitious point or a generator of each rolling element is thus able to rotate either in the longitudinal direction of its relevant shaft or perpendicular to this with the result that, by means of the transfer device according to DE-AS 25 15 009, a conveyed article arriving on a roller conveyor can first be braked as it moves onto the transfer device and then be branched through 90° by appropriate actuation of the two sets of rolling elements.

The transfer device according to DE-AS 25 15 009 also has only restricted suitability under harsh operating conditions since a multiplicity of shafts and appropriate bearing sleeves are required in the vicinity of the rolling elements. Furthermore, only a certain part of the load-bearing rolling elements at a given point is driven, i.e., only the part of the rolling elements sitting on the shafts which are driving at a given point, whereas the auxiliary load-bearing elements simply rotate freely with the result that uniform and precise conveying in the X-Y plane, and in reversible mode moreover, is possible only to a limited extent.

It is therefore the object of the present invention to construct a multi-directional drive for roller conveyors or similar according to the generic part of claim 1 that is both simple and robust in design and permits reliable multi-directional operation.

The solution of this object according to the invention is thus provided by the characteristics indicated in claim 1.

Advantages and useful improvements to the solution of the object form the characteristics of the subsidiary claims.

An embodiment of the invention is described below with reference to the drawing.

The single FIGURE in the drawing shows a schematically simplified representation, partially in section, of a preferred embodiment of a multi-directional drive for roller conveyors or similar, in accordance with the invention.

As shown in the drawing, a multi-directional drive 2 comprises a plurality of rolling elements 4,6 which are consecutively mounted on a shaft configuration 8.

The figure shows only two rolling elements 4 and 6; it is, however, self-evident that a plurality of rolling elements can be configured whereby a plurality of shaft configurations 8 can also be configured parallel to each other where the individual rolling elements 4 and 6 are advantageously offset on the shaft configurations 8 relative to each other as shown by means of a chain-dot line in the figure.

As also apparent from the drawing, the shaft configuration 8 consists essentially of an outer hollow quill 10 coaxially encompassing an inner rotating shaft 12 which is solid if necessary. As also apparent from the drawing, the quill 10 is discontinuous in the region of the rolling bodies 4 and 6, thus exposing the inner rotating shaft 12 at these points. As a result of the discontinuity of the quill 10 in the region of the rolling bodies 4 and 6 there are two free, opposed faces in the region of each rolling element, for example in the region of the rolling element 4, on the quill, on which faces according to the present invention gearwheels 14 and 16 are mounted such that they cannot rotate freely. The gearwheels 14 and 16 are preferably in the form of bevelled gears and comprise in the region of their rotational axis an appropriately sized bore through which the rotating shaft 12 can pass. If required, a bearing sleeve can be provided where the rotating shaft 12 passes through the gearwheels 14 and 16 (14' and 16') to guide the rotating shaft 12 which ensures a clean mount between the quill, rotating shaft and the individual gearwheels. The use of porous bearings is particularly advantageous because of their excellent durability and emergency running properties.

The two gearwheels 14 and 16 in the region of the rolling element 4 or 14' and 16' in the region of the rolling element 6 are linked in a gear system by means of an idle wheel 18 or 18' which meshes with the two gearwheels 14 and 16 or 14' and 16' and whose rotational axis is perpendicular to the rotational axis of the gearwheels 14 and 16 or 14' and 16'. This idle wheel 18 or 18' is preferably also a bevelled wheel.

The idle wheel 18 or 18' is flange-mounted to an intermediate shaft 20 or 20' whose longitudinal axis is perpendicular to the longitudinal axis of the shaft configuration 8 and which —as apparent from the drawing —passes through the rotating shaft in the region of an appropriate bearing recess 22 or 22'. In other words, the intermediate shaft 20 or 20' is mounted such that it is rotatable in and perpendicular to the rotating shaft 12 of the shaft configuration 8 by means of the bearing configuration 22 or 22'.

Each of the rolling elements 4, 6 consists according to the to the invention of two sub-elements 24 and 26 or 24' and 26', where in accordance with the drawing the sub-element 24 of the rolling element 4 is connected to the idle wheel 18 such that it cannot rotate independently, the sub-element 24' of the rolling element 6 is connected to the intermediate shaft 20' such that it cannot rotate independently, and the sub-element 26' of the rolling element 6 is connected to the idle wheel 18' such that it cannot rotate freely. The sub-elements are formed such that they are at least approximately hemispherical. The essential feature is that the configuration of the idle wheel 18 and of the subsequent idle wheel 18' end of the following idle wheel 18 in turn, etc., in the plane as shown in the figure should be such that the idle wheels should be alternately above and below the shaft configuration 8.

Bearing configurations which are provided to support the shaft configuration 8 or the quill 10 and rotating shaft 12 against a fixed frame, drives for the quill 10 and rotating shaft 12 and coupling devices to couple the quill 10 and the rotating shaft 12 or to disengage the connection between the quill 10 and the rotating shaft 12 are not shown in the drawing. The operation and operating principle of the multi-directional drive 2 in accordance with the invention are described below— with continued reference to the drawing:

The quill 10 of the shaft configuration 8 is supported by means of appropriate bearing devices against a fixed frame such that the hemispherical sub-elements 24 and 26 or 24' and 26' of the rolling elements 4 and 6 are held at the desired height above the fixed frame. If, when the rotating shaft 12 is stationary, torque is induced in the quill 10 such that the left section as shown in the drawing of the quill 10 rotates in the direction of the arrow A, this motion is also transmitted to the gearwheel 14 which then rotates on the rotating shaft 12. The idle wheel 18 which is meshed with the gearwheel 14 thus also rotates, thereby causing additionally the sub-element 24 of the rolling element 4 to rotate, which sub-element 24 is mounted on the idle wheel 18 such that it cannot rotate independently. Because of the fixed coupling between the sub-element 24 and the sub-element 26 by means of the intermediate shaft 20, rotary motion is also imparted to the sub-element 26 in the same direction with the result that the two sub-elements 24 and 26 rotate in the direction of arrow B in the drawing. The gearwheel 16 which is meshed with the idle wheel 18 and which is mounted on the rotating shaft 12 and connected to the middle section of the quill 10 as shown in the drawing such that it cannot rotate independently, i.e., driven by the rotation of the idle wheel 18 such that the gearwheel 16 and the intermediate section of the quill 10 in the drawing rotate in the direction of arrow C. In other words, as a result of the configuration of the gearwheels 14, 16 and 18, the direction of rotation is reversed between the left section of the quill 10 according to the drawing and the middle section of the quill 10 according to the drawing.

Rotation of the quill 10 in the direction of arrow C results in rotary motion being imparted to the gearwheel 14' in the rolling element 6, and since the idle wheel 18' in the rolling element 6 is located at 180°, i.e. is axially symmetrical relative to the shaft configuration 8, relative to the idle wheel 18 in the rolling element 4 according to the figure in the drawing, rotation of the quill 10 in the direction of arrow C or of the gearwheel 14' in the direction of arrow C causes rotation of the idle wheel 18' and thus of the sub-element 26' and also, via the intermediate shaft 20', of the sub-element 24' in the direction of arrow D, i.e. in the same direction as in the case of the rolling element 4. Power is transferred from the rolling element 6 via the gearwheel 16' with the result that the right section of the quill 10 according to the drawing rotates in the direction of arrow E, i.e., again in the same direction as in the case of an induced torque (arrow A) in the rolling element 4. A further rolling element connected to the rolling element 6 comprises thus in turn a gear configuration as in the case of the rolling element 4 with the result that the sub-elements of this also undergo the same rotary motions as the sub-elements 24 and 26 or 24' and 26' of the rolling elements 4 and 6. If an appropriate torque is induced in all the rolling elements 4 and 6 of the entire multi-directional drive 2 any goods, e.g., a pallet or similar, resting on the sub-elements 24 and 26 of the rolling elements will be conveyed in the direction of arrow I. A reversal of the induced torque, i.e., the induction of a torque in the opposition direction to arrow A, causes the sequences of rotary motion described above to be reversed, as a result of which any goods resting on the rolling elements 4 and 6 will be moved in the opposite direction to arrow I. If a coupling which is not shown in the drawing is now actuated causing the quill 10 and the rotating shaft to be locked together and if a torque is then induced in the quill 10 in the direction of arrow A as shown or in the rotating shaft 12 in the direction of arrow F as shown, there is no relative motion between the quill 10 and the rotating shaft 12 because of the engaged lock between them, with the result that the rolling elements 4 and 6 rotate over the entire length of the shaft configuration 8 in the direction of arrow A or F, such that any goods deposited on the rolling elements are moved in the direction of arrow II. Here too, a reversal of the direction of rotary motion induced results in a reversal of the running direction, causing the deposited goods to be conveyed in the opposite direction to arrow II.

If an appropriate field in the X-Y plane is now provided with the multi-directional drive 2 according to the invention consisting of a plurality of parallel shaft configurations 8 with rolling elements 4 and 6 mounted on them, any goods deposited on this field can be conveyed at will in the direction X-Y, depending on how the quills and rotating shafts are actuated. It would, for example, even be conceivable to provide appropriate couplings and drives for the quill 10 and rotating shaft 12 not only on the end faces of the shaft configuration 8 but also in the area between the two end faces of a shaft configuration 8, as a result of which individual rolling element fields or sections can be independently actuated.

As is apparent from the above, the multi-directional drive is particularly suitable not only for roller conveyors or similar, especially for transfer units or corner tables, but also it can be used whenever goods which are to be conveyed, for example pallets or containers, must be moved in an X-Y direction and positioned, as far as is possible, automatically and without human intervention. Applications, for example, in automatic conveyor lines in manufacturing industry, pallet warehouse or similar are conceivable. Use of the multi-directional drive according to the invention in conjunction with a semi-or fully automatic parking system as described in German patent application No. P 3908 858.8, (U.S. Ser. No. 492,677, filed Mar. 13, 1990) by the same applicant bearing the same date is particularly advantageous. In this respect, reference is made to the full contents of this application.

In summary, therefore, this multi-directional drive according to the invention for roller conveyors or similar is characterized in that the simple, robust structure with its small number of moving parts enables goods which are to be conveyed semi- or fully automatically to be moved quickly and reliably, with reversing operation both in the X and Y direction being easily achieved.

I claim:

1. Multi-directional drive for roller conveyors comprising a plurality of rolling elements 4, 6 which are consecutively mounted on at least one powered shaft, the elements can rotate selectively in each of the longitudinal direction of the shaft or perpendicular thereto, characterized therein that the shaft is formed as a hollow quill (10) and is intended to encompass coaxially an inner rotating shaft (12);

the quill (10) is discontinuous in the region of the rolling elements (4, 6), forming two free, opposed faces there;

gearwheels (14, 16) which are drivingly coupled together by means of an idle wheel (18) perpendicular to them, are mounted on the free faces of the quill such that they cannot rotate freely, where the rotational axis of the idle wheel (18) intersects the longitudinal axis of the rotating shaft (12);

the rotary motion of each idle wheel (18) is transmitted to a plane of rotation which is axially symmetrical to the rotating shaft (12) relative to the plane of rotation of the idle wheel (18); and that the rolling elements consist of two sub-elements (24, 26) which are located in both rotational planes, and the quill (10) can selectively rotate relative to the stationary rotating shaft (12).

2. Drive according to claim 1, characterized therein that the quill (10) and rotating shaft (12) is selectively coupled together to initiate synchronous rotation.

3. Drive according to claim 1, characterized therein that the sub-elements (24, 26) are approximately hemispherical and are selectively driver by the idle wheel (18).

* * * * *